(No Model.)
C. H. MATTESON.
WEFT FORK.
No. 547,084. Patented Oct. 1, 1895.
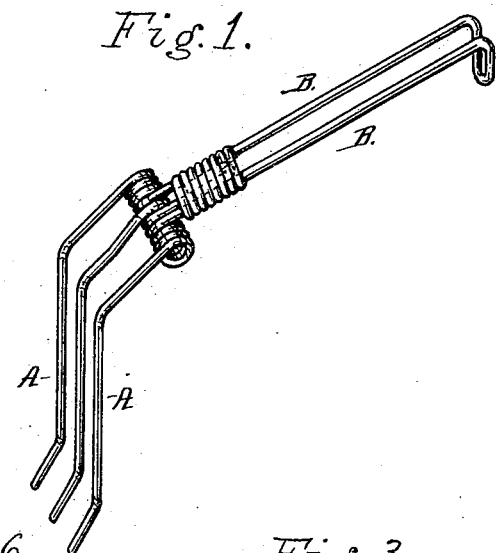
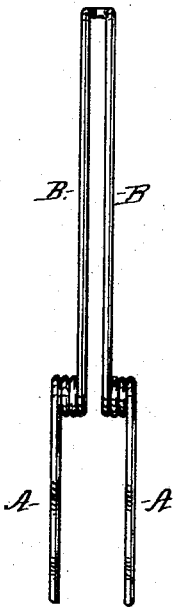
  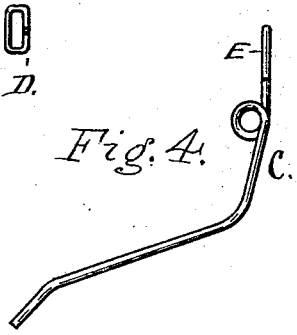 
Witnesses.
Eugene F. Warner
A. E. Maclaine
Inventor.
Charles Henry Matteson
by Walter B. Vincent
Att'y.

UNITED STATES PATENT OFFICE.

CHARLES HENRY MATTESON, OF ANTHONY, RHODE ISLAND.

WEFT-FORK.

SPECIFICATION forming part of Letters Patent No. 547,084, dated October 1, 1895.

Application filed January 15, 1895. Serial No. 535,027. (No model.)

*To all whom it may concern:*

Be it known that I, CHARLES HENRY MATTESON, of Anthony, in the State of Rhode Island, have made certain new and useful Improvements in Filling-Forks; and I do hereby declare that the following specification, taken in connection with the drawings making a part of the same, is a full, clear, and exact description thereof.

Figure 1 is a perspective view of my improved fork. Fig. 2 is a view of the same prior to the addition of the middle tine. Figs. 3 and 4 are front and side views, respectively, of the middle tine. Figs. 5 and 6 are front and end views of the wrapping-wire.

My invention relates to a filling-fork used upon looms for the purpose of bringing into operation the stop-motion whenever the filling fails; and it consists in the improved construction of the device whereby its durability is greatly increased and its operation made more satisfactory, as hereinafter described.

My fork, exclusive of the central tine, is formed in the same manner as those now in use and as shown in Fig. 2 of the drawings.

In the fork now in use the center tine is made with a single coil, as shown in Figs. 3 and 4, and the ends bent to conform to the shape of the outer tines, the short end consisting of a straight single piece of wire and occupying a position between and parallel with the two parts of the handle shown in Fig. 2 when the parts are placed together. The center tine having been placed in the position thus indicated the short arm is secured to the parallel wires upon either side of it by incasing the whole in solder, as is well understood. This manner of uniting the parts of the fork heretofore employed has not been satisfactory for the reason that the center tine frequently breaks away from the solder, necessitating the stoppage of the machinery for repairs.

In the drawings, A A are the outer tines of the fork and B B the parallel wires forming the handle.

C is the center tine and D is the coiled wire used to unite and secure the parts, thus forming the completed device.

The outer tines and the handle, as shown in Fig. 2, are formed the same as those now in use. The short arm E of the center tine is formed with a loop at the end, as shown in Figs. 3 and 4, the loop being so made that both parts of the wire forming it will lie in the same horizontal plane with the wires B B forming the handle. After the parts are placed together in proper relation to each other a portion of the handle B B is wrapped with a half-round wire covering the short arm of the center tine. After the wire is wrapped around, as described, the same may be set up compactly by a die or other pressure, thus firmly securing and uniting the several parts. The flat surface presented by the loop in the short arm of the center tine effectually prevents the same from turning or otherwise becoming displaced.

The wrapping-wire may be first put into the form of a collar, as shown in Fig. 5, and afterward slipped onto the wires B B forming the handle and brought to its proper position, as shown in Fig. 1; or a solid collar, of suitable metal, may be adjusted in the same way, the parts in either case being finally brought together compactly by means of a die or other pressure, as before described. I do not, however, consider the solid collar so desirable for the reason that it will not so readily adapt itself under pressure to the inequalities of the contact-surface as the wire. If the wrapping or collar is slipped on, such adjustment must necessarily occur before the end of the handle is bent over.

The wrapping-wire D employed is not necessarily half-round, although I consider that form the most effective and desirable.

What I claim as my invention, and desire to secure by Letters Patent, is—

In a filling fork, the combination, with the bent tines and parallel handles, each provided with an intermediate coil or pivotal point, of a central tine therebetween, having a coil and an arm doubled upon itself, the doubled end lying upon the same side of the wire as the coil, the doubled portion of the arm and the handles lying parallel with and contiguous to each other in the same plane, and a flattened collar of coiled wire rigidly secured upon these handles and doubled arms, substantially as set forth.

CHARLES HENRY MATTESON.

Witnesses:
EUGENE F. WARNER,
WALTER B. VINCENT.